US005448272A

United States Patent [19]

Kagayama

[11] Patent Number: 5,448,272

[45] Date of Patent: Sep. 5, 1995

[54] IMAGE FORMING APPARATUS

[75] Inventor: Shigeru Kagayama, Owariasahi, Japan

[73] Assignee: Brother Kogyo Kabushiki Kaisha, Nagoya, Japan

[21] Appl. No.: 316,359

[22] Filed: Oct. 3, 1994

[30] Foreign Application Priority Data

Nov. 4, 1993 [JP] Japan .................................. 5-275498

[51] Int. Cl.[6] .............................................. G01D 15/16

[52] U.S. Cl. ........................................................ 347/55

[58] Field of Search ............................ 346/159; 347/55

[56] References Cited

U.S. PATENT DOCUMENTS

| | | | |
|---|---|---|---|
| 3,689,935 | 9/1972 | Pressman et al. | 347/55 |
| 4,743,926 | 5/1988 | Schmidlin et al. | 347/55 |
| 4,755,837 | 7/1988 | Schmidlin et al. | 347/55 |
| 4,780,733 | 10/1988 | Schmidlin | 347/55 |
| 4,814,796 | 3/1989 | Schmidlin | 347/55 |
| 4,912,489 | 3/1990 | Schmidlin | 347/55 |
| 4,929,968 | 5/1990 | Ishikawa | 347/55 |
| 5,036,341 | 7/1991 | Larsson | 347/55 |
| 5,095,322 | 3/1992 | Fletcher | 347/55 |
| 5,198,840 | 3/1993 | Ochiai et al. | 347/55 |
| 5,257,045 | 10/1993 | Bergen et al. | 347/55 |
| 5,357,274 | 10/1994 | Kitamura | 347/55 |

*Primary Examiner*—Benjamin R. Fuller
*Assistant Examiner*—Randy W. Gibson
*Attorney, Agent, or Firm*—Oliff & Berridge

[57] ABSTRACT

An electrode unit of an image forming apparatus has plural apertures that are formed in a row on an insulating sheet and control electrodes each of which is formed on the upper surface thereof in correspondence with each aperture. A rectifying unit is provided on an opposite surface of the insulating sheet to a surface of the insulating sheet on which the control electrodes are provided so that the guide unit is not overlapped with the apertures in a toner feeding direction. With this construction, toner carried on a portion of a toner carry roller that does not confront each aperture, is guided to a portion confronting each aperture by the rectifying unit through rotation of the toner carry roller, whereby a sufficient amount of toner is supplied to the apertures at all times. Therefore, a sufficient amount of toner can be supplied even in a high-speed recording operation, and an excellent recording operation can be performed.

22 Claims, 5 Drawing Sheets

IMAGE FORMING APPARATUS

BACKGROUND OF THE INVENTION

1. Field of the Invention

The present invention relates to an image forming apparatus that is suitably usable for a copying machine, a printer, a plotter, a facsimile machine, or the like.

2. Description of Related Art

One image forming apparatus that has been conventionally known is disclosed in U.S. Pat. No. 3,689,935 in which an electrode having plural opening portions (hereinafter referred to as "apertures") is used, and a voltage is applied to the electrode in accordance with image data to control passage of toner particles through the apertures, whereby an image is formed on a supporter (image receiving medium) with toner particles that have past through the apertures.

The image forming apparatus includes an aperture electrode unit comprising an insulating flat plate, a reference electrode formed continuously on one surface of the flat plate, plural control electrodes that are formed on the other surface of the flat plate and that are electrically insulated from one another, and at least one row of apertures each of which is formed in correspondence with each control electrode so as to penetrate through the flat plate, the reference electrode and the control electrodes. The image forming apparatus also includes structure for selectively applying a voltage across the reference electrode and the control electrodes, structure for supplying charged toner particles so that the flow of the toner particles passed through the apertures is modulated in accordance with the applied voltage, and structure for moving a supporter and the aperture electrode unit relative to each other to position the supporter in a particle flow passage.

U.S. Pat. Nos. 4,743,926, 4,755,837, 4,780,733, and 4,814,796 disclose image forming devices having an aperture electrode unit disposed so that control electrodes face a supporter and a reference electrode faces a toner supply side.

On the other hand, U.S. Pat. No. 4,912,489 discloses an aperture electrode unit disposed so that the reference electrode faces the supporter and the control electrodes face the toner supply side. The reference describes that a voltage to be applied to the control electrodes at an off-time can be reduced to about a quarter of that of the image forming apparatus as disclosed in the above patents.

The term "off-time" means a time when no toner particle is attached onto the supporter, that is, when a blank portion of an image is formed on the supporter, and conversely, the term "on-time" means a time when a toner image is formed on the supporter.

However, in the conventional image forming apparatus, it has been difficult to obtain a sufficient recording speed. In addition, it has been found that toner is not sufficiently supplied beneath the apertures of the aperture electrode unit. That is, since the amount of toner that is supplied to the aperture electrode unit is not sufficiently supplied to the supporter, which is fed at a high speed, a print operation with high toner density cannot be performed even with a highly efficient electric-field control.

Still further, when the apertures are arranged on a row in a width direction of the aperture electrode unit, some of the supplied toner particles that are just below the apertures are past over the aperture electrode unit without being used, and these toner particles do not contribute to the image formation in the print operation.

SUMMARY OF THE INVENTION

An object of this invention is to provide an image forming apparatus that can perform a sufficient recording operation at a high speed.

In order to attain the above object, an image forming apparatus according to this invention includes a carrier for carrying and supplying charged particles, an electric-field controller disposed so as to face the carrier through the charged particles and having a control unit for controlling flow of the charged particles with an electric field, a back electrode disposed so as to face the electric-field controller through an image receiving medium, and a guide for guiding the flow of the charged particles so that the charged particles carried on the carrier are collected on the control unit of the electric-field controller, the guide being disposed on at least a surface of the electric-field controller.

According to the image forming apparatus of the present invention thus constructed, the charged particles carried on the carrier are guided to a portion facing a control unit of the electric-field controller. Accordingly, the supply amount of toner that is usable for a printing operation can be increased, and a high-speed print operation can be performed.

BRIEF DESCRIPTION OF THE DRAWINGS

Preferred embodiments of the present invention will be described in detail with reference to the following figures wherein.

DETAILED DESCRIPTION OF PREFERRED EMBODIMENTS

Preferred embodiments according to this invention will be described with reference to the accompanying drawings.

Figure 1:
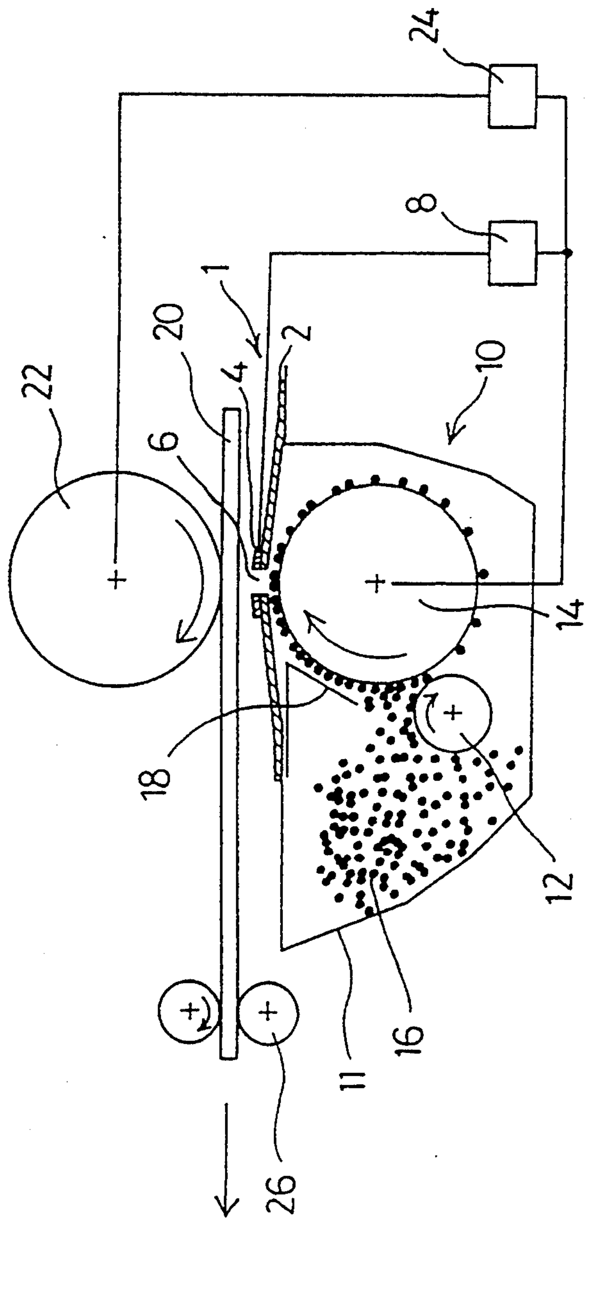
FIG. 1 is a diagram showing an image forming apparatus.

FIG. 1 schematically shows an image forming apparatus according to this invention. In the image forming apparatus shown in FIG. 1, a cylindrical back electrode roller 22 serving as a counter electrode is rotatably supported by a chassis (not shown) so as to be spaced about 1 mm from and above the upper side of an aperture electrode unit 1 serving as electric-field control means, whereby a supporter 20 can be inserted and fed into the gap between the back electrode roller 22 and the electric-field control means 1. In addition, a toner supply device 10 is disposed at the lower side of the aperture electrode unit 1 along a longitudinal direction of the aperture electrode unit 1, and a fixing device 26 is disposed downstream of a feeding path of the supporter 20, which is fed by the back electrode roller 22.

Next, each of the above elements will be individually described in more detail.

The toner supply device 10 comprises a toner case 11, which also serves as a housing for the device itself, toner 16 stocked in the toner case 11, a toner supply roller 12, a toner carry roller 14, and a toner-layer restricting blade 18. The toner carry roller 14 serves to carry the toner 16 thereon and feed the toner 16 toward the aperture electrode unit 1, and the toner supply roller 12 serves to supply the toner 16 to the toner carry roller 14.

The toner supply roller 12 and the toner carry roller 14 are supported by the toner case 11 so as to be rotatable in a direction as indicated by the arrows in FIG. 1, and both of the rollers 12 and 14 are disposed in contact with and in parallel to each other. The toner-layer restricting blade 18 serves to adjust a toner layer so that the amount of the toner 16 carried on the toner carry roller 14 is made uniform on the roller surface, the toner 16 is uniformly charged, and it is in pressed contact with the toner carry roller 14.

Figure 2:
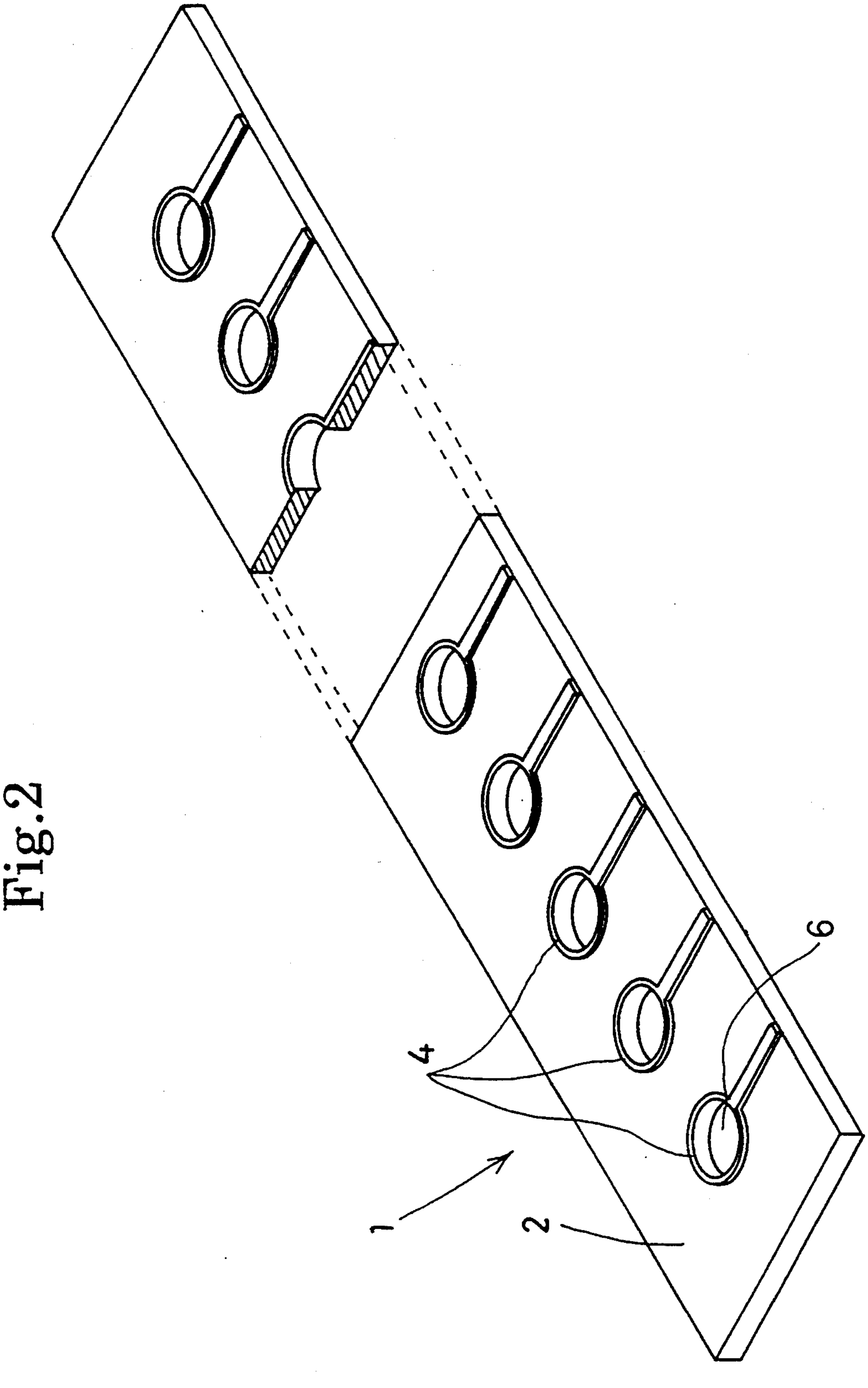
FIG. 2 is a perspective view showing the construction of an aperture electrode unit used in an image forming apparatus.

As shown in FIG. 2, the aperture electrode unit 1 comprises an insulating sheet 2, which is preferably formed of polyimide and has a thickness of 25 μm, unplural apertures 6 having a diameter of 100 μm formed in the insulating sheet 2 in a row, and control electrodes 4 having a thickness of l μm, each of which is formed on the upper surface of the insulating sheet 2 in correspondence with each of the apertures 6. The aperture electrode unit 1 thus constructed is pressed against the toner carry roller 14 at an aperture position of the insulating sheet while the control electrodes 4 face the supporter 20 as shown in FIG. 1.

Figure 4A:
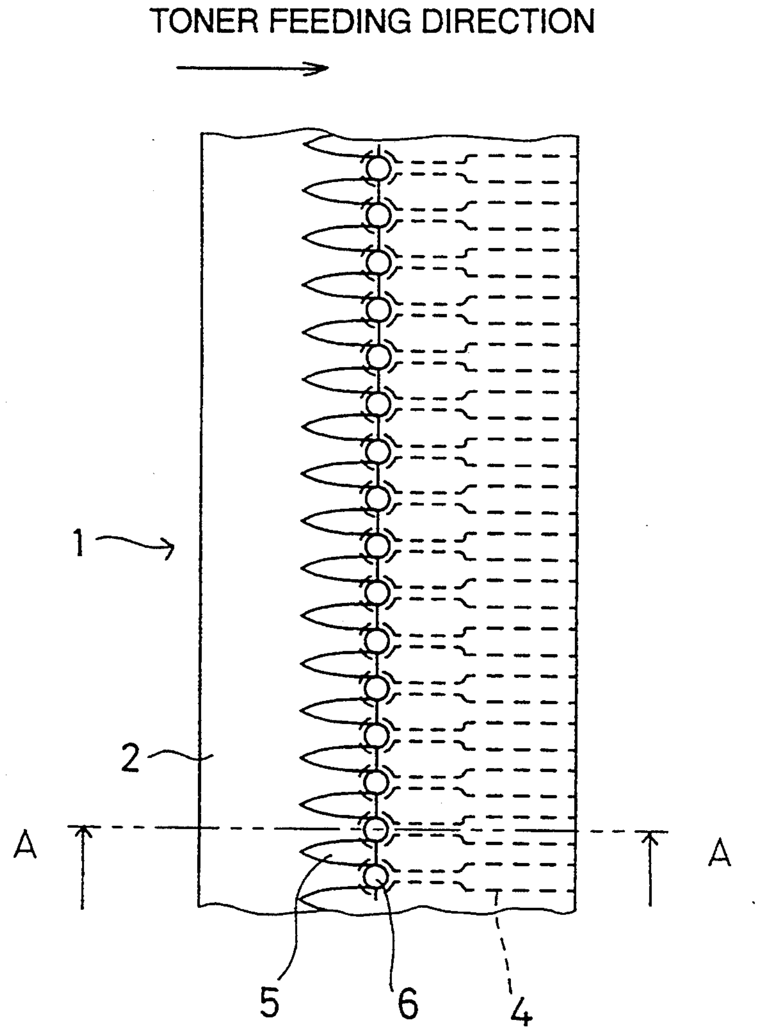
FIG. 4A is a schematic view showing the construction of a first embodiment of the aperture electrode unit, which is viewed from the lower side of the aperture electrode unit.
Figure 4B:
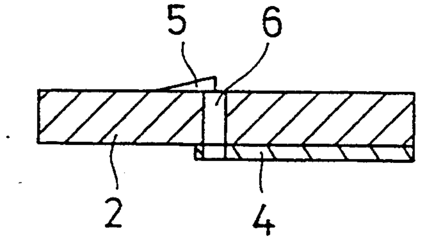
FIG. 4B is a cross-sectional view of the aperture electrode unit of the first embodiment.

The detailed construction of the aperture electrode unit 1 of this embodiment will be described with reference to FIGS. 4A and 4B. FIG. 4A shows the aperture electrode unit 1 viewed from the lower side thereof, and FIG. 4B is a cross-sectional view of the aperture electrode unit taken along A—A line in FIG. 4A.

In this embodiment, a guide unit (guide elements) 5 is provided on one surface of the insulating sheet 2 of the aperture electrode unit 1, which is opposite to the other surface of the insulating sheet 2 on which the control electrodes 4 are provided. The guide unit 5 is disposed so as not to be overlapped with the apertures 6 in a toner feeding direction, that is, each of the guide elements 5 is disposed between neighboring apertures 6. Each guide element 5 is designed to be larger in its height direction or depth than at least the diameter of the toner and also designed in a funnel form that enables the toner to be guided to each aperture 6, that is, it is designed to be sharpened at the tip thereof and gradually widened in the toner feeding direction.

The guide unit 5 may be formed of any material. However, it is preferable to be formed of the same material as the insulating sheet because it has the same sliding characteristic as the insulating sheet 2. In addition, the guide unit 5 and the insulating sheet 2 may be formed integrally with or separately from each other. If both elements are formed of the same material, it is preferable that both elements are formed integrally with each other.

Any method may be used to design the guide elements in the shape as described above insofar as it can form a projecting surface on the insulating sheet 2. For example, a screen printing method, an off-set printing method, a sputtering method, a deposition method or the like may be used.

Next, the positional relationship between the apertures 6 of the aperture electrode unit 1 and the toner carry roller 14 will be described in detail.

Figure 3:
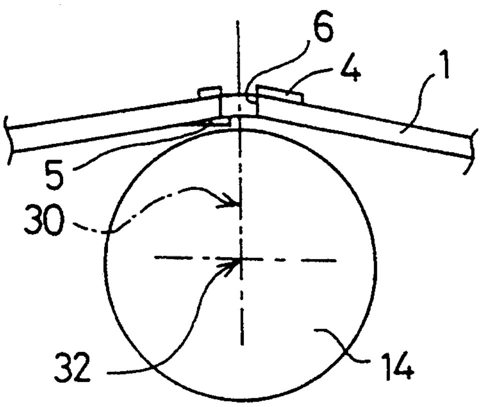
FIG. 3 is a schematic diagram showing the construction of an aperture electrode unit and a toner carry roller used in the image forming apparatus.

As shown in FIG. 3, each aperture 6 is disposed so that the center line 30 thereof passes through the highest portion of the perimeter of the toner carry roller 14 and the center axis 32 of the toner carry roller 14. With this arrangement, each aperture 6 is uniformly disposed at the right and left sides with respect to the highest portion of the perimeter of the toner carry roller 14, so that the toner 16 passing through each aperture 6 can be uniformly distributed over the whole area in the aperture. In addition, since the wall surface of each aperture 6 is substantially parallel to a flight (supply) direction of the toner 16, the toner can be stably supplied through the apertures 6.

The aperture electrode unit 1 itself is pressed against the toner carry roller 14 so as to be flexible to the right and left sides with respect to the apertures 6 relative to the toner carry roller 14. With this arrangement, the contact area between the aperture electrode unit 1 and the toner carry roller 14 can be increased, and the lower peripheral portion of each aperture 6 can be uniformly pressed at the right and left sides thereof, so that unevenness of toner density can be minimized.

A control voltage applying circuit 8 is connected across the control electrodes 4 and the toner carry roller 14, and it serves to apply a voltage of 0 V or +50 V to the control electrodes 4 in accordance with an image signal.

Further, a DC power source 24 is connected across the back electrode roller 22 and the toner carry roller 14, and it serves to apply a voltage of +1 kV to the back electrode roller 22.

Next, the operation of the image forming apparatus thus constructed will be described.

First, through rotation of the toner carry roller 14 and the toner supply roller 12 as indicated by an arrow of FIG. 1, the toner 16 that is fed from the toner supply roller 12 is rubbed against the toner carry roller 14 to be negatively charged and carried on the toner carry roller 14. The carried toner 16 is thinned by the toner-layer restricting blade 18 to form a thin toner layer and fed toward the aperture electrode unit 1 by rotation of the toner carry roller 14. Thereafter, the toner on the toner carry roller 14 is supplied below the apertures 6 while being rubbed against the insulating sheet 2 of the aperture electrode unit 1.

In this case, the insulating sheet 2 of the aperture electrode unit I is provided with the guide unit 5, so that all the toner 16 that is fed while being carried on the toner carry roller 14 is supplied just below the apertures 6. That is, the toner 16 carried on the toner carry roller 14 approaches to the apertures 6 while being rubbed against the aperture electrode unit 1. At this time, through the rotation of the toner carry roller 14, a part of the toner 16 that is carried on a portion of the toner carry roller 14 that does not face each aperture 6 is guided by the guide unit 5 to be collected in a portion of the toner carry roller 14 that faces each aperture 6, whereby a sufficient amount of the toner 16 is supplied to the apertures 6 at all times.

At this time, a voltage of +50 V is applied from the control voltage applying circuit 8 to the control electrodes 4 corresponding to an image portion in accordance with an image signal. As a result, an electric line of force from the control electrodes 4 to the toner carry roller 14 is formed in the vicinity of the apertures 6 corresponding to the image portion by the potential difference between the control electrodes 4 and the toner carry roller 14. Accordingly, an electrostatic force toward a higher potential side is applied to the negatively charged toner, and the toner is electrostatically attracted from the surface of the toner carry roller 14 through the apertures 6 to the control electrodes 4 side. The attracted toner 16 at the control electrode 4 side is further attracted (flights) toward the supporter 20 by an electric field that is generated between the supporter 20 and the aperture electrode unit 1 due to the voltage applied to the back electrode roller 22. The toner is deposited on the supporter 20, thereby forming an image on the supporter 20.

A voltage of 0 V is applied from the control voltage applying circuit 8 to the control electrodes 4 corresponding to a non-image portion. As a result, no electric field occurs between the toner carry roller 14 and the control electrodes 4, and no electrostatic force is applied to the toner 16 on the toner carry roller 14, so that the toner is not passed through the apertures 6.

The supporter 20 is fed in a direction perpendicular to the aperture array by a distance corresponding to one pixel, while an image on a line (row) is formed on the supporter 20 with the toner 16. Further, by repeating the above process, a toner image can be formed on the whole surface of the supporter 20. Thereafter, the toner image thus formed is fixed on the supporter 20 by the fixing device 26.

Through the above process, the toner image is recorded on the image receiving medium. At this time, a sufficient amount of toner is supplied to the apertures so that the toner supply can sufficiently and effectively perform a high-speed printing or recording operation.

If insulating toner is used in the image forming apparatus thus constructed, the insulation between the toner carry roller 14 and the control electrodes 4 is maintained, and thus, the apertures 6 can be prevented from being broken down.

In the above process, the control electric field by the control electrodes 4 is formed inside of the control electrodes 4 and the apertures 6 and between the apertures 6 and the toner carry surface of the toner carry roller 14, which is confronted to the apertures 6, and thus the control electric field can be directly applied to the carried toner 16, so that control efficiency can be improved.

Further, even when a part of the supplied toner 16 is subjected to a mechanical force or the like through the sliding motion between the toner 16 and the aperture electrode unit 1, and it invades into the apertures 6 corresponding to the non-image portion, the toner can be controlled not to be past through the apertures 6 by the electric field occurring in the apertures 6, so that high controllability of the toner is obtained.

In addition, the toner carry roller 14 and the aperture electrode unit 1 are disposed so as to be facing each other through the toner layer, and thus, these elements can be disposed at a relatively short distance. Accordingly, the control voltage can be reduced, and inexpensive drive elements can be used.

Moreover, the insulating sheet 2 of the aperture electrode unit I is disposed so as to face the toner carry roller 14. Accordingly, even in a case where no toner 16 is supplied onto the toner carry roller 14 because of failure of the toner supply system, contact between the control electrodes 4 and the toner carry roller 14, which may cause the short-circuit of these elements, can be prevented, and thus, the driving elements can be prevented from being broken down.

The aperture electrode unit 1 and the toner 16 on the toner carry roller 14 are contacted with each other at the inlet ports of the apertures, and thus, the toner that is deposited at the inlet ports of the apertures 6 is pushed out by the toner that is successively supplied from the toner carry roller 14, so that clogging of the apertures 6 due to deposition and bridging of the toner 16 does not occur.

This invention is not limited to the above embodiment, and various modifications may be made to the embodiment without departing from the scope of this invention.

For example, the control voltage to be applied to the apertures 6 corresponding to the non-image portion is set to 0 V; however, the control voltage may be set to a negative value. By applying a negative voltage, an image having reduced fog can be obtained. In addition, in the above embodiment, the aperture electrode member 1 is used as the toner flow control means. In place of this aperture electrode member 1, a mesh-shaped electrode member as disclosed in the specification of U.S. Pat. No. 5,036,341 for example may be used.

Figure 5A:
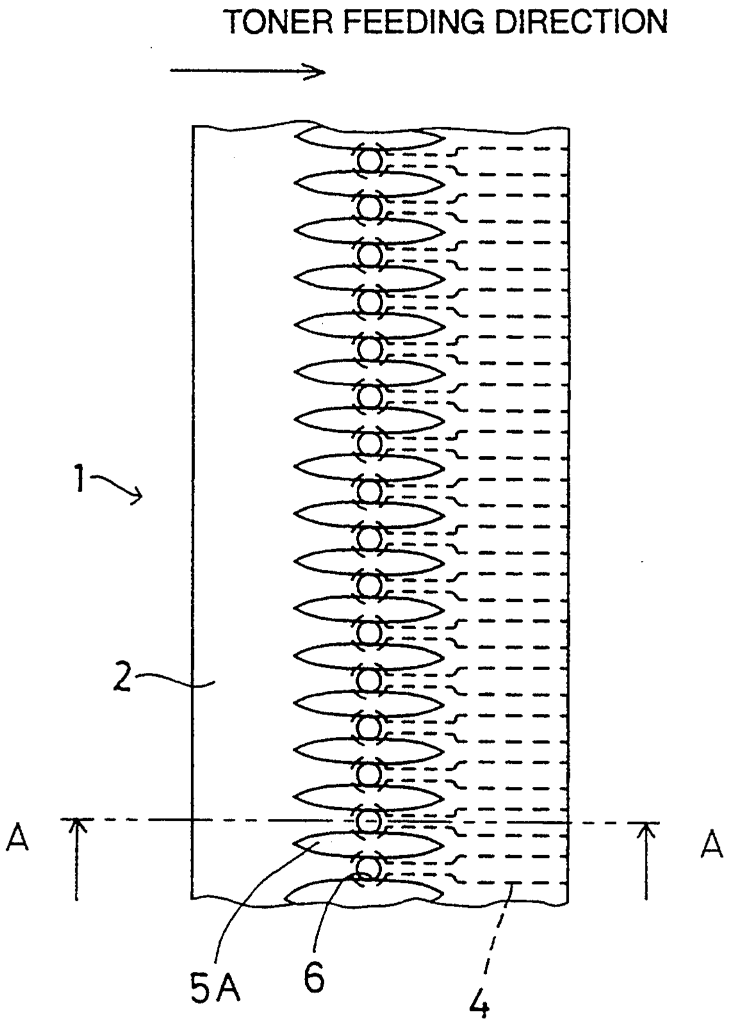
FIG. 5A is a schematic view showing the construction of a second embodiment of the aperture electrode unit, which is viewed from the lower side of the aperture electrode unit.
Figure 5B:
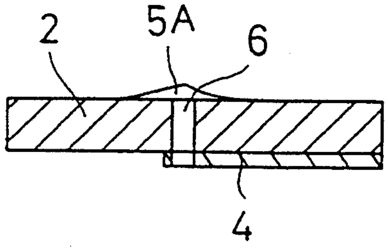
FIG. 5B is a cross-sectional view of the aperture electrode unit of the second embodiment.

Further, in the above embodiment, the guide unit 5 is provided at only the upstream side of the apertures, however, a guide unit 5A may be disposed at the downstream side of the apertures as shown in FIGS. 5A and 5B, which show a second embodiment of this invention. FIG. 5A shows an aperture electrode unit of the second embodiment viewed from the lower side of the aperture electrode unit, and FIG. 5B is a cross-sectional view of the aperture electrode that is taken along A—A line in FIG. 5A. The same elements as the first embodiment are represented by the same reference numerals.

In the second embodiment, guide elements 5A (guide unit), each of which is designed in a conical shape having an apex at the aperture center, is provided on the insulating sheet 2 of the aperture electrode unit 1. The guide unit 5A may be disposed downstream of the apertures 6, and with this arrangement, a part of the toner that does not contribute the image formation is also rapidly past just below the apertures, so that an excellent recording operation can be performed without trapping the toner.

In the above embodiments, the toner flow path is formed by forming projections on the surface of the insulating sheet 2. In place of this construction, the surface roughness of the insulating sheet 2 of the aperture electrode unit 1 may be varied between a toner-flow path and a toner non-flow path to thereby form a guide unit of the toner. That is, the same effect is expected by more roughening the toner non-flow path serving as the guide unit than the toner flow path. As a method of partially varying the surface roughness of the surface of the aperture electrode unit may be used a sandblast method, a wet blasting method, a plasma processing method, an etching method, a lapping method or the like.

What is claimed is:

1. An image forming apparatus comprising:

carrying means for carrying and supplying charged toner particles;

electric-field control means disposed facing said carrying means and having at least one control unit for controlling flow of the charged toner particles through said at least one control unit with an electric field;

a back electrode disposed facing said electric-field control means a predetermined distance from said electric-field control means and on a side of said control means opposite said carrying means; and guide means for guiding the flow of the charged particles so that the charged toner particles carried on said carrying means are guided to pass through said at least one control unit, said guide means being disposed on at least a surface of said electric-field control means.

2. The image forming apparatus as claimed in claim 1, wherein said guide means is disposed so as not to be overlapped with said at least one control unit of said electric-field control means in a toner feeding direction, said guide means guiding the charged toner particles so that the charged particles carried on a portion of said carrying means that does not confront said at least one control unit are guided to a portion of said carrying means that confronts the at least one control unit.

3. The image forming apparatus as claimed in claim 1, wherein said guide means comprises at least one guide unit disposed on a surface of said electric-field control means facing said carrying means.

4. The image forming apparatus as claimed in claim 3, wherein said at least one guide unit is shaped to be larger in depth than a toner diameter.

5. The image forming apparatus as claimed in is claim 3, wherein said at least one guide unit is narrow at a first end and widens toward a second end in a toner feeding direction.

6. The image forming apparatus as claimed in claim 3, wherein said electric-field control means comprises an insulating sheet having a plurality of apertures, and wherein said at least one guide unit is widest at a portion aligned with said apertures in said toner feeding direction, said at least one guide unit narrowing beyond said apertures in said toner feeding direction.

7. The image forming apparatus as claimed in claim 6, wherein said at least one guide unit comprises a conical shape having its apex aligned with said apertures in a feeding direction.

8. The image forming apparatus as claimed in claim 3, wherein a roughness of said surface of said electric-field control means facing said carrying means is varied to define a toner-flow path and a toner non-flow path, the varied roughness surface constituting said at least one guide unit.

9. The image forming apparatus as claimed in claim 1, wherein said electric-field control means comprises an electrode unit, and wherein said carrying means carries said charged toner particles to said electrode unit.

10. The image forming apparatus as claimed in claim 9, wherein said electrode unit comprises an insulating sheet having a plurality of apertures formed in a row therein.

11. The image forming apparatus as claimed in claim 10, wherein said insulating sheet is a polyimide insulating sheet having a thickness of about 25 $\mu$m.

12. The image forming apparatus as claimed in claim 10, wherein said guide means comprises a plurality of guide units disposed on a surface of said insulating sheet facing said carrying means, each of said plurality of guide units being arranged between adjacent ones of said plurality of apertures.

13. The image forming apparatus as claimed in claim 10, wherein said at least one guide unit is formed of the same material as said insulating sheet.

14. The image forming apparatus as claimed in claim 13, wherein said at least one guide unit is formed integral with said insulating sheet.

15. The image forming apparatus as claimed in claim 10, wherein said apertures are disposed uniformly with respect to a peripheral surface of said carrying means.

16. The image forming apparatus as claimed in claim 10, wherein said electrode unit is bent around said toner carrying means.

17. The image forming apparatus as claimed in claim 9, wherein said electrode unit comprises one of an aperture electrode unit and a mesh electrode unit.

18. An image forming apparatus comprising:

an electrode unit having an image forming path through said electrode unit that controls a flow of charged toner particles;

a toner supply system comprising a toner carrier for supplying toner particles to said electrode unit; and at least one guide unit disposed on a surface of said electrode unit facing said toner carrier, wherein said at least one guide unit guides charged toner particles carried on said toner carrier to said image forming path.

19. The image forming apparatus as claimed in claim 18, wherein said electrode unit comprises an insulating sheet having a plurality of apertures formed in a row therein.

20. The image forming apparatus as claimed in claim 19, comprising a plurality of guide units disposed on a surface of said insulating sheet facing said toner carrier, each of said plurality of guide units being arranged between adjacent ones of said plurality of apertures.

21. An image forming apparatus comprising:

an electrode unit that controls a flow of charged toner particles, said electrode unit comprising an insulating sheet having a plurality of apertures formed in a row therein;

a toner supply system comprising a toner carrier for supplying toner particles to said electrode unit; and a plurality of projections disposed on a surface of said insulating sheet facing said toner carry roller, each of said projections being arranged between adjacent ones of said plurality of apertures, wherein each of said projections is narrow at a first end and widens toward a second end in a toner feeding direction and is shaped to be larger in depth than a toner diameter.

22. An image forming apparatus as claimed in claim 18, wherein said electrode unit comprises a plurality of openings defining said image forming paths and said toner carrier is disposed adjacent to said plurality of openings.

* * * * *